United States Patent
Tsujimoto

(10) Patent No.: US 8,665,459 B2
(45) Date of Patent: Mar. 4, 2014

(54) MULTIFUNCTION PERIPHERAL INFORMATION PROCESSOR FOR PROVIDING CONTROL INFORMATION TO A MULTIFUNCTION PERIPHERAL

(75) Inventor: Kunihiko Neil Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 212 days.

(21) Appl. No.: 13/222,275

(22) Filed: Aug. 31, 2011

(65) Prior Publication Data
US 2012/0057181 A1 Mar. 8, 2012

(30) Foreign Application Priority Data

Sep. 6, 2010 (JP) .................... 2010-198874

(51) Int. Cl.
*G06F 3/12* (2006.01)
(52) U.S. Cl.
USPC .......................................... 358/1.13
(58) Field of Classification Search
None
See application file for complete search history.

(56) References Cited

U.S. PATENT DOCUMENTS

| 2002/0049837 A1* | 4/2002 | Kato | 709/223 |
| 2002/0131079 A1* | 9/2002 | Forbes et al. | 358/1.15 |
| 2003/0135571 A1 | 7/2003 | Sato | |
| 2007/0242299 A1* | 10/2007 | Kobayashi et al. | 358/1.13 |
| 2009/0244595 A1* | 10/2009 | Kim et al. | 358/1.15 |

FOREIGN PATENT DOCUMENTS

| JP | 2002-108475 | | 4/2002 |
| JP | 2002-320064 | A | 10/2002 |
| JP | 2003-242093 | | 8/2003 |
| JP | 2006-020196 | | 1/2006 |
| JP | 2007-157074 | | 6/2007 |
| JP | 2007-158817 | A | 6/2007 |
| JP | 2008-117315 | | 5/2008 |
| JP | 2008-124541 | A | 5/2008 |
| JP | 2008-269004 | | 11/2008 |
| JP | 2009-060211 | A | 3/2009 |

* cited by examiner

*Primary Examiner* — Jeremiah Bryar
(74) *Attorney, Agent, or Firm* — Renner, Otto, Boisselle & Sklar, LLP

(57) ABSTRACT

A multifunction peripheral 1 of the present invention includes an image data storage section 16 for storing image data received by a first communication section 14 or a modem 15, the first communication section 14 for transmitting reception information including sender's information of the image data to an information processor 2, and a sections control section 10 for causing, according to control information transmitted from the information processor 2, a predetermined process to be executed on the image data stored in the image data storage section 16.

8 Claims, 8 Drawing Sheets

FIG. 3

| REGISTRATION RECEPTION INFORMATION | | CONTROL INFORMATION | |
|---|---|---|---|
| TYPE OF RECEPTION | SENDER'S INFORMATION | PROCESS TO BE EXECUTED | DESTINATION INFORMATION |
| FAX | 123-456-xxxx | PRINTING | — |
| FAX | 134-567-xxxx | TRANSFERRING | admin@example.com |
| INTERNET FAX | sample@example.com | TRANSFERRING | admin@example.com |
| Email | sample@example.co.jp | DELETING | — |
| ... | ... | ... | ... |
| FAX | 134-678-xxxx | STORING | Folder1 |

FIG. 5

```
<?xml version="1.0" encoding="UTF-8"?>
<Receive>
   <fileId>1234</fileId>
   <type>fax</type>
   <number>0123-456-xxx</number>
   <name>ABC CO., LTD.</name>
   <size>5MB</size>
   <startAt>20100501-123456</startAt>
   <endAt>20100501-123538</endAt>
</Receive>
```

FIG. 6

```
<?xml version="1.0" encoding="UTF-8"?>
<ReceiveResponse>
   <fileId>1234</fileId>
   <process>
      <type>email</type>
      <address>sample@example.com</address>
   </process>
</ReceiveResponse>
```

FIG. 7

```
<?xml version="1.0" encoding="UTF-8"?>
<ReceiveResponse>
   <fileId>1234</fileId>
   <process>
      <type>email</type>
      <address>sample@example.com</address>
   </process>
   <error>
      <process>
         <type>print</type>
      </process>
   </error>
</ReceiveResponse>
```

```
<?xml version="1.0" encoding="UTF-8"?>
<Event>
   <fileId>1234</fileId>
   <status>started</status>
</Event>
```

```
<?xml version="1.0" encoding="UTF-8"?>
<Event>
   <fileId>1234</fileId>
   <status>finished</status>
</Event>
```

FIG. 11

| REGISTRATION RECEPTION INFORMATION | | CONTROL INFORMATION | |
|---|---|---|---|
| TYPE OF RECEPTION | SENDER'S INFORMATION | PROCESS TO BE EXECUTED | DESTINATION INFORMATION |
| FAX | 123-456-xxxx | STORING | User1 |
| FAX | 134-567-xxxx | STORING | User2 |
| INTERNET FAX | sample@example.com | STORING | User3 |
| Email | sample@example.co.jp | STORING | User4 |
| ... | ... | ... | ... |
| FAX | 134-678-xxxx | STORING | UserN |

MULTIFUNCTION PERIPHERAL INFORMATION PROCESSOR FOR PROVIDING CONTROL INFORMATION TO A MULTIFUNCTION PERIPHERAL

This Nonprovisional application claims priority under 35 U.S.C. §119(a) on Patent Application No. 2010-198874 filed in Japan on Sep. 6, 2010, the entire contents of which are hereby incorporated by reference.

TECHNICAL FIELD

The present invention relates to a multifunction peripheral control system in which a multifunction peripheral operates in association with an information processor. In particular, the present invention relates to a multifunction peripheral control system in which an information processor uniformly manages control information for image data received by a multifunction peripheral (such as a fax machine) that has a communication function.

BACKGROUND ART

Recently, there has been proposed a technique (Inbound Routing) of transmitting, on the basis of sender's information such as a facsimile number or an e-mail address of a sender, image data of a facsimile received by a fax machine to a pre-registered destination.

Patent Literature 1 discloses, as an example of the technique, a system in which a terminal device communicable with a multifunction peripheral remotely changes a destination pre-registered in the multifunction peripheral.

CITATION LIST

Patent Literature

Patent Literature 1

Japanese Patent Application Publication, Tokukai No. 2009-060211 A (Publication Date: Mar. 19, 2009)

SUMMARY OF INVENTION

Technical Problem

However, the system disclosed in Patent Literature 1 is configured such that control information such as a forwarding address is registered in each multifunction peripheral. Accordingly, in a case where pieces of control information registered in a plurality of multifunction peripheral are changed, it is necessary to change the pieces of control information in each multifunction peripheral, individually. This makes it highly complicate to change the pieces of control information.

In order to solve the problem of Patent Literature 1, for example, a system in which an information processor communicable with a multifunction peripheral uniformly manages control information can be considered. That is, the following system can be considered: a system in which image data received by a multifunction peripheral is transmitted to an information processor, and then the image data is transmitted to a predetermined destination by the information processor on the basis of pre-registered control information. According to the system, pieces of control information registered in a plurality of multifunction peripherals can be changed merely by changing the pieces of control information uniformly managed by the information processor. In this manner, the problem of Patent Literature 1 can be solved. Such a technical idea has not been disclosed yet.

However, in such a system, the image data received by the multifunction peripheral is firstly transmitted from the multifunction peripheral to the information processor, and then further transmitted from the information processor to the predetermined destination. This newly causes a problem that it takes time to transmit the image data because network traffic between the multifunction peripheral and the information processor is increased. Particularly, in a case where large-volume image data is transmitted, it takes plenty of time to transmit the large-volume image data. This makes the problem more obvious.

The present invention was made in view of the problem, and an object of the present invention is to produce a multifunction peripheral capable of executing a predetermined process on image data received by the multifunction peripheral without having registered control information such as a forwarding address therein.

Solution to Problem

In order to attain the object, a multifunction peripheral of the present invention is a multifunction peripheral communicable with an information processor via a communication network, including: image data receiving means for receiving image data via the communication network; image data storage means for storing the image data received by the image data receiving means; reception information transmitting means for transmitting, to the information processor, reception information including sender's information of the image data received by the image data receiving means; control information receiving means for receiving, from the information processor, control information including a first process to be executed on the image data received according to details of the reception information; and sections control means for executing, according to the control information, the first process to be executed on the image data stored in the image data storage means.

According to the invention, in a case where the image data receiving means receives the image data via the communication network, the image data storage means stores the image data therein, and the reception information transmitting means transmits the reception information including the sender's information of the image data to the information processor.

What is meant by the reception information is various information such as sender's information on image data. Examples of the sender's information encompass a facsimile number, an e-mail address, an Internet facsimile address of a sender that sends the image data.

Further, in a case where the control information receiving means receives, from the information processor, the control information including the first process to be executed on the image data, the sections control section executes the first process on the image data according to the control information.

As described above, the present invention is configured such that the multifunction peripheral obtains the control information for the image data from the information processor by transmitting the reception information to the information processor while retaining the image data received by the multifunction peripheral.

This configuration makes it possible to produce a multifunction peripheral capable of executing a predetermined process on the image data thus received without having registered the control information therein.

In order to attain the object, an information processor of the present invention is an information processor communicable with the multifunction peripheral via the communication network, including: control information storage means for storing specifying information in association with control information including a first process to be executed on image data received according to details of the specifying information, the specifying information including at least a part of the reception information and at least the sender's information; reception information receiving means for receiving the reception information from the reception information transmitting means; control information reading means for reading out, from the control information storage means, the control information corresponding to the specifying information among the reception information received by the reception information receiving means; and control information transmission controlling means for controlling the control information read out by the control information reading means to be transmitted to the control information receiving means.

According to the invention, in a case where the reception information receiving means receives the reception information, the control information reading means reads out the control information corresponding to the reception information from the control information storage means. Further, the control information transmission controlling means controls the control information read out by the control information reading means to be transmitted to the control information receiving means. That is, the information processor can uniformly manage the control information.

This makes it possible to produce an information processor capable of causing the multifunction peripheral to execute a predetermined process on the image data thus received while the multifunction peripheral has not registered the control information therein.

Advantageous Effects of Invention

As described above, a multifunction peripheral of the present invention is a multifunction peripheral communicable with an information processor via a communication network, including: image data receiving means for receiving image data via the communication network; image data storage means for storing the image data received by the image data receiving means; reception information transmitting means for transmitting, to the information processor, reception information including sender's information of the image data received by the image data receiving means; control information receiving means for receiving, from the information processor, control information including a first process to be executed on the image data received according to details of the reception information; and sections control means for executing, according to the control information, the first process to be executed on the image data stored in the image data storage means.

Further, an information processor of the present invention is an information processor communicable with the multifunction peripheral via the communication network, including: control information storage means for storing specifying information in association with control information including a first process to be executed on image data received according to details of the specifying information, the specifying information being at least a part of information among the reception information and including at least the sender's information; reception information receiving means for receiving the reception information from the reception information transmitting means; control information reading means for reading out, from the control information storage means, the control information corresponding to the specifying information among the reception information received by the reception information receiving means; and control information transmission control means for controlling the control information read out by the control information reading means to be transmitted to the control information receiving means.

It is according possible to produce (i) a multifunction peripheral capable of executing a predetermined process on the image data received by the multifunction peripheral without having registered control information such as a forwarding address therein, and (ii) an information processor capable of controlling the multifunction peripheral.

BRIEF DESCRIPTION OF DRAWINGS

FIG. 3 is a table showing an example of a control information managing table controlled by a control information managing DB shown in FIG. 2.

FIG. 5 is a view showing a part of a reception notification transmitted from the multifunction peripheral to the information processor at S103 of FIG. 4.

FIG. 6 is a view showing a part of a control notification transmitted from the information processor to the multifunction peripheral at S106 of FIG. 4.

FIG. 7 is a view showing a modified example of the control notification shown in FIG. 6.

FIG. 11 is a table showing a modified example of the control information managing table shown in FIG. 3.

DESCRIPTION OF EMBODIMENTS

The following describes an embodiment of the present invention with reference to FIGS. 1 through 12. The present embodiment describes, as an example, a multifunction peripheral control system including a multifunction peripheral and an information processor in accordance with the present invention.

[Configuration of a Multifunction Peripheral Control System]

Figure 1:
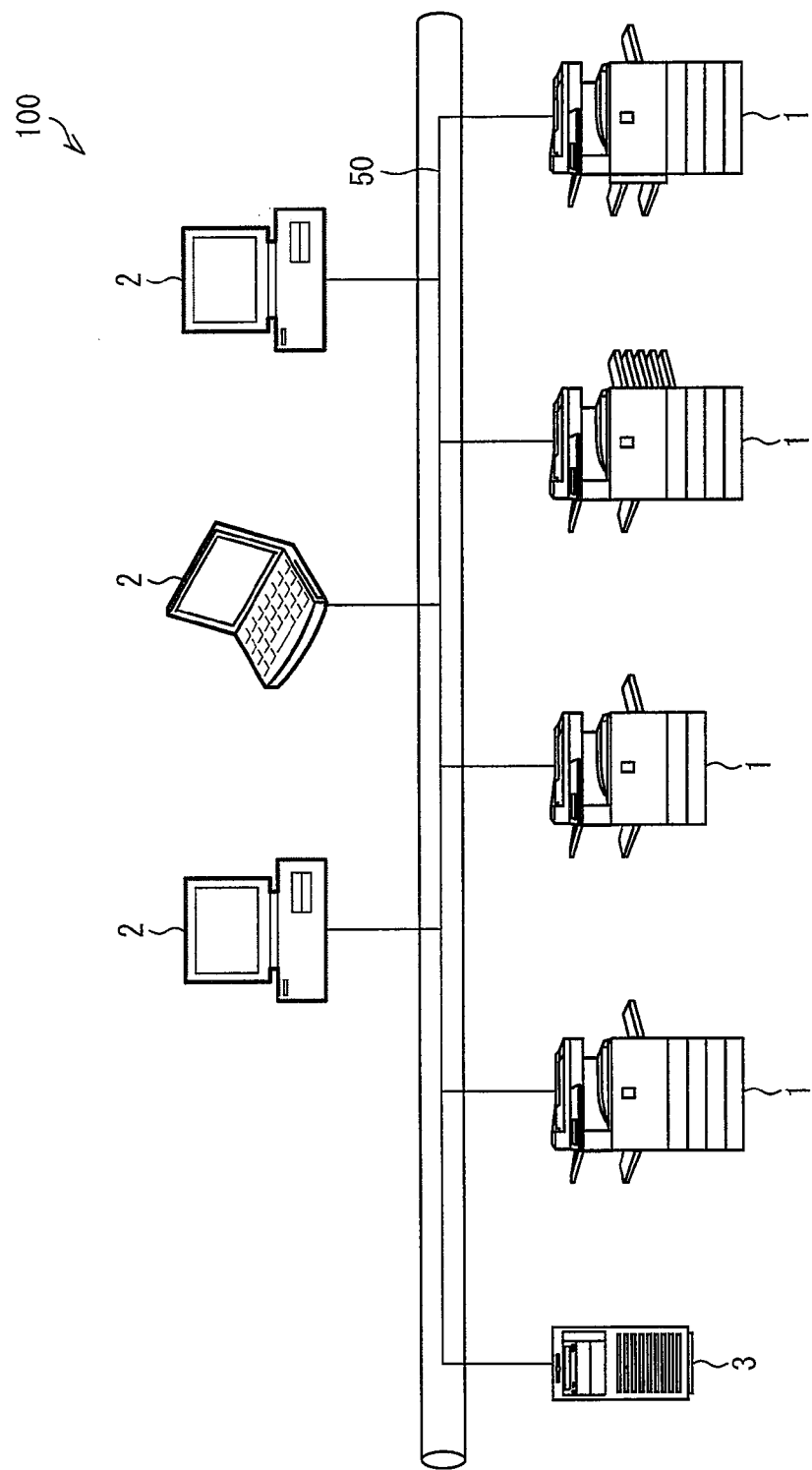
FIG. 1 is a view schematically showing an example of a configuration of a multifunction peripheral control system including a multifunction peripheral and an information processor in accordance with the present invention.

FIG. 1 is a view schematically showing an example of a configuration of a multifunction peripheral control system 100 including a multifunction peripheral 1 and an information processor 2 in accordance with the present invention.

As shown in FIG. 1, the multifunction peripheral control system 100 includes a plurality of multifunction peripherals 1, a plurality of information processors 2 that operate in association with the multifunction peripherals 1, an authentication server 3 for authenticating a user. The plurality of multifunction peripherals 1, the plurality of information processors 2, the authentication server 3 are connected to one another via a communication network line 50 such as a LAN or a WAN. This allows the constituent included in the multifunction peripheral control system 100 to communicate with one another by means of a predetermined communication protocol via the communication network line 50.

Examples of the communication network line 50 encompass various communication lines such as the Internet, a telephone line, a serial cable, other wired lines, and a wireless line. The communication network line 50 of the present embodiment is controlled by a router, and connected to the Internet via an optical fiber.

Figure 2:
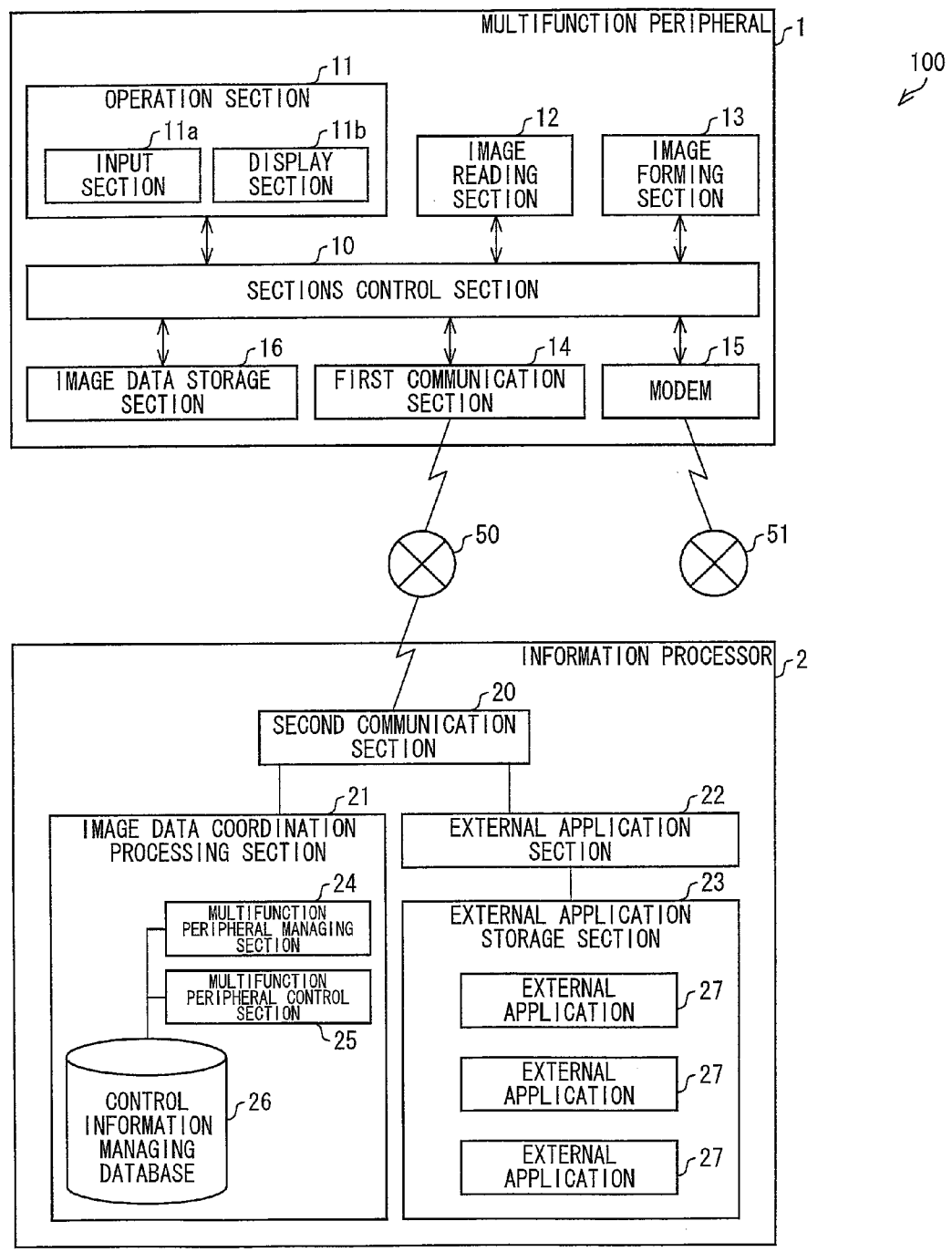
FIG. 2 is a block diagram schematically showing an example of a configuration of the multifunction peripheral and the information processor shown in FIG. 1.

FIG. 2 is a block diagram schematically showing an example of a configuration of the multifunction peripheral 1 and the information processor 2 shown in FIG. 1. As shown in FIG. 2, the multifunction peripheral 1 and the information processor 2 are connected to each other via the communication network line 50, and communicable with each other by means of a communication method such as an HTTP, an HTTPS or an SOAP (Simple Object Access Protocol). The following describes the configuration of the multifunction peripheral 1 and the information processor 2.

[Configuration of the Multifunction Peripheral]

Firstly, the configuration of the multifunction peripheral 1 is described with reference to FIG. 2. As shown in FIG. 2, the multifunction peripheral 1 is a digital multifunction peripheral including a sections control section (sections control means) 10, an operation section 11, an image reading section 12, an image forming section 13, a first communication section (image data receiving means, reception information transmitting means, control information receiving means, and notification means) 14, a modem (image data receiving means) 15, and an image data storage section (image data storage means) 16.

The sections control section 10 controls sections included in the multifunction peripheral 1. Further, the sections control section 10 obtains reception information on image data of a facsimile, an Internet facsimile, an e-mail or the like transmitted from an external device, and stores the image data in the image data storage section 16. The reception information of the present embodiment is various information on image data received by the multifunction peripheral 1. Examples of the reception information encompass sender's information such as a facsimile number, an Internet facsimile address or an e-mail address, and information on details of reception such as a type of reception (for example, a facsimile, an Internet facsimile or an e-mail), an image data size, a communication start time, a communication end time and information on facsimile line (information on the line to be used). For example, the sections control section 10 stores, in the image data storage section 16, image data of a facsimile received by the modem 15.

Further, the sections control section 10 transmits, to the information processor 2 via the first communication section 14, a reception notification for notifying the information processor 2 of the reception information. The reception notification may include all the reception information, alternatively may include merely reception information corresponding to registration reception information (specifying information, see FIG. 3) to be later described. In a case where the reception notification includes merely the reception information corresponding to the registration reception information, network traffic between the multifunction peripheral 1 and the information processor 2 can be reduced.

Further, the sections control section 10 controls the sections to execute predetermined processes on the image data, on the basis of control information included in a control notification corresponding to the reception notification in a case where the sections control section 10 receives the control notification from the information processor 2. For example, in a case where the sections control section 10 obtains control information instructing to transmit image data, the sections control section 10 reads out the image data from the image data storage section 16, and controls the sections to transmit the corresponding image data thus read out to a predetermined destination. Meanwhile, in a case where the sections control section 10 obtains control information instructing to print image data, the sections control section 10 reads out the image data from the image data storage section 16, and controls the image forming section 13 to print the corresponding image data thus read out.

Further, the sections control section 10 controls various processes according to an instruction supplied via the operation section 11 by a user. For example, in a case where a user inputs a fax number of a destination and a sender's name via the operation section 11, and then pushes a transmission start button, the sections control section 10 controls the image reading section 12 to read a document to supply image data of the document to the sections control section 10. The sections control section 10 supplies the image data in a form transmittable by fax to the modem 15 and causes the modem 15 to perform fax transmission of the image data.

The operation section 11 is a user interface for notifying a user of various information and receiving an instruction from a user. The operation section 11 includes an input section 11a including various input keys and a display section 11b such as a liquid crystal display (LCD). Further, the operation section 11 may be a touch panel in which the input section 11a unites with the display section 11b.

The image reading section 12 includes a scanner and a document carrying section for carrying a document to where the scanner is provided, and reads, as image data, letters, an image or the like printed on a document.

The image forming section 13 prints, on a recording sheet such as paper, an image (letters, a photograph or a graphic) of image data supplied to the image forming section 13. Further, the image forming section 13 includes a photoreceptor drum, a charging device, an exposure device, a developing device, a transfer device, a fixing device, a paper tray and the like. Specifically, the image forming section 13 prints (i) image data supplied from the image reading section 12 or (ii) image data such as print data or a facsimile supplied from an external device or the like via the first communication section 14 or the modem 15.

The first communication section 14 is an interface for communicating with the information processor 2 and other external devices via the communication network line 50 such as a wired LAN (Local Area Network) or a wireless LAN. The first communication section 14 receives an Internet facsimile, an e-mail or the like from an external device, and supplies image data of the Internet facsimile, the e-mail or the like to the sections control section 10.

Further, the first communication section 14 transmits, to an external device via the communication network line 50, an output signal obtained by converting the image data read by the image reading section 12 into an appropriate form. Furthermore, the first communication section 14 can transmit image data by e-mail.

The modem 15 is an interface for communicating with an external device via a telephone line 51. The modem 15 receives a facsimile or the like from an external device, and supplies image data of the facsimile or the like to the sections control section 10. Further, the modem 15 transmits, to an external device via the telephone line 51, the output signal obtained by converting the image data read by the image reading section 12 into an appropriate form.

The image data storage section 16 is configured to store therein image data received by facsimile, Internet facsimile, e-mail or the like. An RAM, an HDD or the like can be used as the image data storage section 16. Specifically, the image data storage section 16 stores various image data such as letters, a photograph or a graphic.

[Configuration of the Information Processor]

The following describes the configuration of the information processor 2 with reference to FIG. 2. The information processor 2 is configured with a personal computer in which an application program is incorporated. As shown in FIG. 2, the information processor 2 is a server computer including a second communication section (reception information receiving means) 20, an image data coordination processing section 21, an external application section 22, and an external application storage section 23.

The second communication section 20 is an interface for communicating with the multifunction peripheral 1 and other external devices via the communication network line 50 such as a wired LAN or a wireless LAN. The second communication section 20 receives a reception notification from the multifunction peripheral 1, and supplies the reception notification to the image data coordination processing section 21. Further, the second communication section 20 transmits, to the multifunction peripheral 1, a control notification supplied from the image data coordination processing section 21.

The image data coordination processing section 21 controls the image data coordination process performed by the multifunction peripheral 1 and the information processor 2 in combination. Further, the image data coordination processing section 21 identifies, on the basis of reception information, image data received by the multifunction peripheral 1, and transmits control information to the multifunction peripheral 1 so that the multifunction peripheral 1 executes a predetermined process on the image data. As shown in FIG. 2, the image data coordination processing section 21 includes a multifunction peripheral managing section (control information reading means) 24, a multifunction peripheral control section (control information transmission control means) 25, and a control information managing database (DB) (control information storage means) 26.

The multifunction peripheral managing section 24 manages information on multifunction peripherals 1 that are under the management of the information processor 2. Specifically, when the multifunction peripheral managing section 24 receives reception information from a multifunction peripheral 1, the multifunction peripheral managing section 24 determines whether or not this multifunction peripheral 1 is one of multifunction peripherals 1 under the management of the information processor 2. In a case where the multifunction peripheral 1 is one of such multifunction peripherals, the multifunction peripheral managing section 24 refers to the control information managing database (see FIG. 3) 26. Thereafter, the multifunction peripheral managing section 24 reads out, from a control information managing table on the basis of the reception information, control information including information on a process to be executed on image data, and supplies the control information to the multifunction peripheral control section 25.

The multifunction peripheral control section 25 controls transmission of the control information read out by the multifunction peripheral managing section 24 so as to transmit the control information to the multifunction peripheral 1, so that a predetermined process is executed on the image data received by the multifunction peripheral 1. Specifically, the multifunction peripheral control section 25 transmits, to the multifunction peripheral 1 via the second communication section 20, a control notification for notifying the multifunction peripheral 1 of the control information transmitted from the multifunction peripheral managing section 24.

The control information managing database 26 stores the control information managing table. In the control information managing table, registration identification information and control information associated with each other are pre-registered and managed. Further, the control information managing table is later described in detail.

The external application section 22 operates in accordance with a predetermined web application. That is, the external application section 22 operates in accordance with various web applications that operate on a web server. The web applications is, for example, a custom application written by Java (registered trademark) script, and an application that operates in a Java (registered trademark) script executable environment provided on a web server.

The external application storage section 23 stores various external applications 27 for controlling the multifunction peripheral 1.

[Control Information Managing Table]

The following describes the control information managing table stored in the control information managing database 26, with reference to FIG. 3.

FIG. 3 is a table showing, as an example, a control information managing table controlled by the control information managing database 26. As shown in FIG. 3, the control information managing table has pre-registered the registration reception information and the control information therein. Specifically, the registration reception information, and the control information corresponding to the registration reception information are managed in the left and right columns of the table, respectively.

What is meant by the registration reception information is information for specifying the image data received by the multifunction peripheral 1 (or can be called information indicating details of reception of the image data). The registration reception information has arbitrarily registered therein at least one or two pieces of information among various information included in the reception information transmitted from the multifunction peripheral 1. Examples of the registration reception information encompass sender's information, types of reception, an image data size, communication time (communication start time and communication end time), and information on facsimile line.

What is meant by the sender's information is information for specifying senders that send image data received by the multifunction peripheral 1. Examples of the sender's information encompass a facsimile number, an Internet facsimile address and an e-mail address of a sender that sends image data. Registering the sender's information as the registration reception information makes it possible to change control information of image data for each facsimile number, each Internet facsimile address or each e-mail address of senders. The sender's information is shown as an example in the second column from the left-hand side of the control information managing table of FIG. 3.

The types of reception specify reception methods of image data received by the multifunction peripheral 1. Examples of the types of reception encompass a facsimile, an Internet facsimile and an e-mail. Registering the types of reception as the registration reception information makes it possible to transmit an Internet facsimile by e-mail in a case of receiving the Internet facsimile, and to print a facsimile in a case of receiving the facsimile by a telephone line. The types of reception are shown as an example in the first column from the left-hand side of the control information managing table of FIG. 3.

The image data size specifies sizes of image data received by the multifunction peripheral 1. Registering the image data size as the registration reception information makes it possible to change control information in accordance with the image data size. For example, image data having a size smaller than a predetermined size can be transmitted to a mobile terminal device, and image data having at least the predetermined size can be transmitted to a PC.

The communication time specifies time periods which the multifunction peripheral 1 needs to start and finish receiving image data. Registering the communication time as the registration reception information makes it possible, for example, not to transmit image data which it takes longer than a predetermined communication time to transmit because it is predictable that it takes time to transmit the image data.

The information on facsimile line specifies which facsimile line receives image data among a plurality of facsimile lines (telephone lines) in a case where the multifunction peripheral 1 includes more than one facsimile line. Registering, as the registration reception information, the information on facsimile line makes it possible, for example, to transmit, to a sales department, image data transmitted through a facsimile line A (telephone No. xxx-xxx-xxx1) because the facsimile line A is used for ordering, and to print image data transmitted through a facsimile line B (telephone No. xxx-xxx-xxx2) because the facsimile line B is used for communication between a head office and a branch office of a company.

Further, types and the number of the registration reception information managed in the control information managing table can be changed as appropriate if necessary.

The control information is information for controlling the multifunction peripheral 1 such that a predetermined process is executed on image data identified according to the registration reception information. That is, the control information is information indicating the predetermined process to be executed on the image data received in accordance with details of the registration reception information. The control information includes, for example, a process to be executed on the image data, and destination information such as a forwarding address.

The process to be executed (first process to be executed) is the kind of the process to be executed by the multifunction peripheral 1 on image data received by the multifunction peripheral 1. Examples of the process to be executed encompass transmitting, printing, deleting and storing. The process to be executed is shown as an example in the second column from the right-hand side of the control information managing table of FIG. 3.

The transmitting indicates transmitting, by means of a data transmitting protocol such as an e-mail, a facsimile, an Internet facsimile, an SMB, an HTTP POST or an FTP, the image data thus received.

The printing indicates printing the image data thus received by means of a printing function of the multifunction peripheral 1. Specifically, the sections control section 10 controls the image forming section 13 to form an image of the image data and print the image on a recording paper or the like.

The deleting indicates deleting the image data thus received. The multifunction peripheral 1 possibly receives image data of a facsimile or an e-mail transmitted as an advertisement. Therefore, image data transmitted from a specific sender registered as the registration reception information in the control information managing table is deleted from the control information managing table as unnecessary image data. Alternatively, the control information managing table is designed such that data transmitted from a sender that is not registered as the registration reception information in the control information managing table is to be deleted, and the multifunction peripheral 1 is controlled to delete such data.

The storing indicates keeping storing the image data thus received in the image data storage section 16 included in the multifunction peripheral 1. This allows a user to, by operating the operation section 11, see the image data, and then select a process to be executed on the image data such as printing the image data if necessary or deleting the image data when the image data is unnecessary image data.

The destination information is information indicating a destination to which image data is transmitted, a place in which image data is stored or the like. Examples of the destination information encompass a facsimile number, an Internet facsimile address, an e-mail address, and a holder name. Further, the destination information is information registered in a case where the image data is to be transmitted or stored, and the destination information is shown as an example in the first column from the right-hand side of the control information managing table of FIG. 3.

Further, types and the number of the control information managed in the control information managing table can be changed as appropriate if necessary.

As described above, in the multifunction peripheral control system 100, the information processor 2 uniformly manages the control information that was conventionally registered for each multifunction peripheral. This makes it possible to change control information registered in a plurality of multifunction peripherals merely by changing details of the control information managing table managed in the information processor 2 even in a case where the control information registered in the plurality of multifunction peripherals should be changed.

[Image Data Coordination Process]

Figure 4:
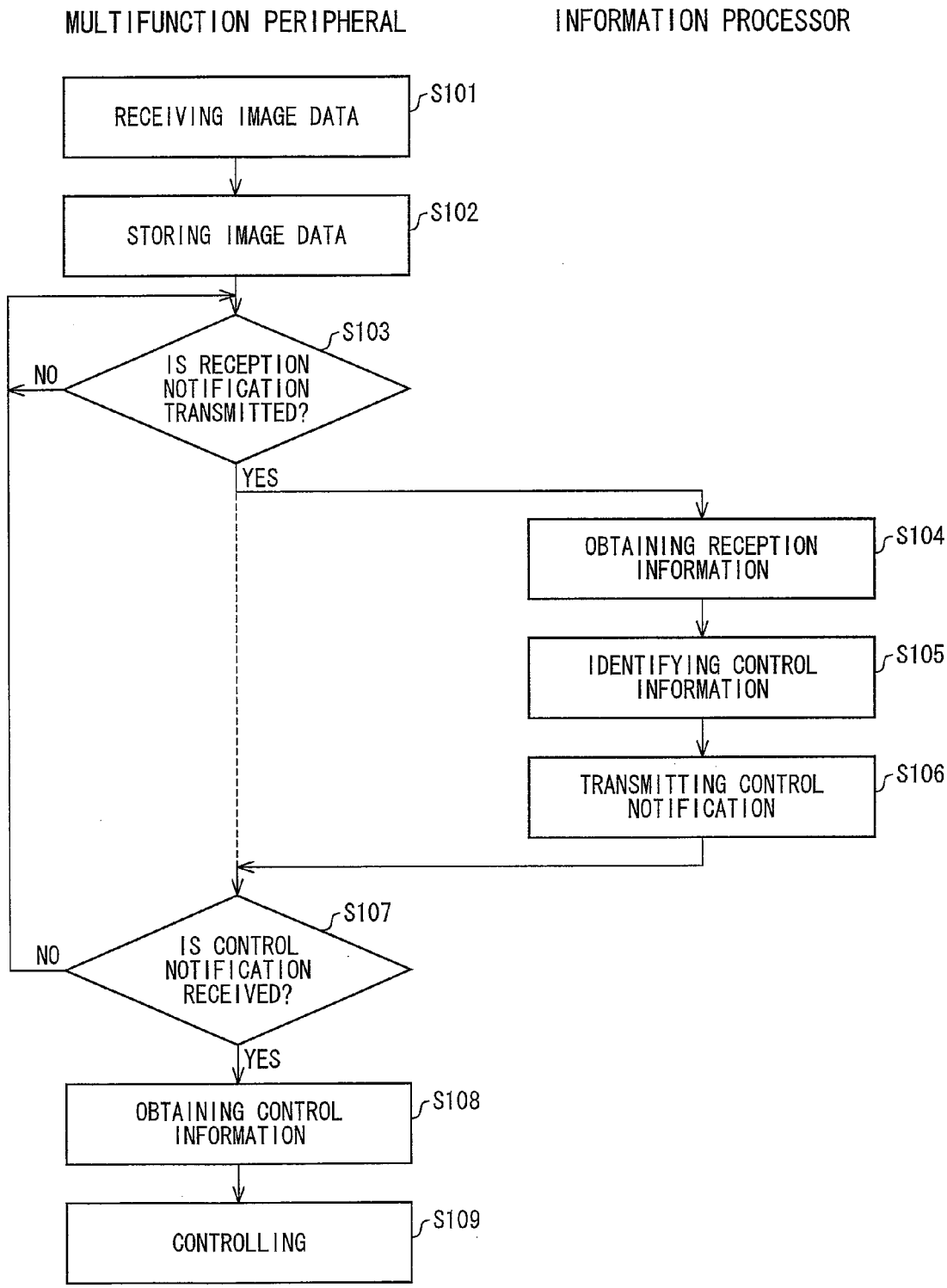
FIG. 4 is a flowchart showing how the multifunction peripheral and the information processor shown in FIG. 2 process image data in association with each other.

The following describes, with reference to FIGS. 4 through 6, how the multifunction peripheral 1 and the information processor 2 included in the multifunction peripheral control system 100 process image data in association with each other.

FIG. 4 is a flowchart showing how the multifunction peripheral 1 and the information processor 2 included in the multifunction peripheral control system 100 process image data in association with each other. As described above, the multifunction peripheral 1 can receive image data from an external device via the communication network line 50 or the telephone line 51. Specifically, the multifunction peripheral 1 receives image data through the telephone line 51 in a case of receiving a facsimile or through the communication network line 50 in a case of receiving an Internet fax, an e-mail or the like.

The sections control section 10 obtains reception information of image data, and stores the image data in the image data storage section 16 when the sections control section 10 receives the image data via the modem or the first communication section 14 (S101). Specifically, the sections control section 10 stores, in the image data storage section 16, the image data to which identification information is attached. The identification information is employed to read out, from the image data storage section 16, image data corresponding to control information obtained in a subsequent step (S108).

Thereafter, the sections control section 10 transmits a reception notification including the reception information to the information processor 2 via the first communication section 14. The reception notification includes, for example, (i) sender's information such as types of reception, a facsimile number, a sender's name, and an e-mail address, (ii) reception information such as an image data size, a communication start time and a communication end time, and (iii) identification information for identifying image data.

FIG. 5 is a view showing a part of a reception notification transmitted to the information processor 2 from the multifunction peripheral 1 at S103 of FIG. 4. Note that the reception notification shown in FIG. 5 shows a SOAP-based example, and the SOAP is an XML, HTTP or the like-based protocol for calling up data or a service. Employing such a reception notification makes it possible to cause devices to process in association with each other.

In the reception notification of FIG. 5, <fileId>1234</fileId> indicates identification information, <type>fax</type> indicates types of reception, <number>0123-456-xxx</number> indicates sender's information, <name>ABC Co.Ltd.</name> indicates a sender's name, <size>5MB</size> indicates an image data size, <startAt>20100501-123456</startAt> indicates a communication start time, and <endAt>20100501-123538</endAt> indicates a communication end time. Further, in the reception notification of FIG. 5, the identification information is included in a category of reception information. However, the present invention is not limited to this. Alternatively, the identification information may be included in another category different from the category of reception information.

Thereafter, the sections control section 10 determines whether or not the transmission of the reception notification to the information processor 2 through the first communication section 14 has been completed (S103).

In a case where the reception notification has not been transmitted to the information processor 2 yet (in a case of NO at S103), the sections control section 10 controls the first communication section 14 to retransmit the reception notification. Meanwhile, in a case where the reception notification has been already transmitted to the information processor 2 (in a case of YES at S103), the multifunction peripheral 1 waits until the multifunction peripheral 1 receives a control notification from the information processor 2 or a predetermined time period passes by.

Meanwhile, in a case where the information processor 2 receives the reception notification from the multifunction peripheral 1 via the second communication section 20 (S104), the multifunction peripheral managing section 24 determines whether or not the multifunction peripheral 1 that transmits the reception notification is one of the multifunction peripherals 1 under the management of the information processor 2. Specifically, the multifunction peripheral managing section 24 determines whether or not the multifunction peripheral 1 is one of such multifunction peripherals 1, by referring to an internal memory by use of a key such as device information included in the reception notification.

In a case where the multifunction peripheral 1 that transmits the reception notification is one of such multifunction peripherals 1, the multifunction peripheral managing section 24 identifies control information with reference to the control information managing database 26 (S105).

The following describes in details how to transmit a control notification, with reference to the control information managing table shown in FIG. 3. Firstly, the multifunction peripheral managing section 24 searches whether or not registration reception information corresponding to reception information included in the reception notification is registered in the left column of the control information managing table included in the control information managing database 26.

In a case where the registration reception information corresponding to the reception information is registered there, the multifunction peripheral managing section 24 reads out control information from the right column of the control information managing table included in the control information managing database 26, and supplies, to the multifunction peripheral control section 25, the control information thus read out. The multifunction peripheral control section 25 then transmits, to the multifunction peripheral 1 via the second communication section 20, a control notification for notifying the multifunction peripheral 1 of the control information supplied from the multifunction peripheral managing section 24 (S106).

FIG. 6 is a view showing a part of a control notification transmitted to the multifunction peripheral 1 from the information processor 2 at S106 of FIG. 4. The control notification shown in FIG. 6 is transmitted from the information processor 2 to the multifunction peripheral 1 in response to the SOAP-based reception notification shown in FIG. 5.

In the control notification shown in FIG. 6, <fileId>1234</fileId> indicates identification information, <type>email</type> indicates a process to be executed, and <address>sample@example.com</address> indicates destination information. That is, on the basis of the control information shown in FIG. 6, the multifunction peripheral 1 transmits the image data received by the multifunction peripheral 1 to "sample@example.com".

In a case where the sections control section 10 of the multifunction peripheral 1 receives the control notification from the information processor 2 (in a case of YES at S107), the sections control section 10 returns from a standby state, and obtains the control information from the control notification (S108).

Meanwhile, in a case where the sections control section 10 does not receive the control notification within a predetermined time period (in a case of NO at S107), the sections control section 10 returns from the standby state, and retransmits a reception notification to the information processor 2.

After S108, the sections control section 10 controls, on the basis of the control information, the sections to execute predetermined processes on image data (S109). For example, in a case where the sections control section 10 receives the control notification shown in FIG. 6, the sections control section 10 reads out image data from the image data storage section 16 with reference to the identification information <fileId>1234</fileId>, creates, on the basis of the process to be executed <type>email</type> and the destination information <address>sample@example.com</address>, control commands for controlling the sections, and controls the image data thus read out to be transmitted.

As described above, the multifunction peripheral 1 of the present embodiment includes the image data storage section 16 for storing image data received by the first communication section 14 or the modem 15, the first communication section 14 for transmitting reception information including sender's information of the image data to the information processor 2, and sections control section 10 for executing, on the basis of control information transmitted from the information processor 2, a predetermined process on the image data stored in the image data storage section 16.

Further, the information processor 2 of the present embodiment includes (i) the control information managing database 26 for storing registration reception information included in the reception information, and control information corresponding to the registration reception information, (ii) the second communication section 20 for receiving the reception information from the multifunction peripheral 1, (iii) the multifunction peripheral managing section 24 for reading out, from the control information managing database 26 on the basis of the registration reception information, control information corresponding to the reception information received by the second communication section 20, and (iv) the multifunction peripheral control section 25 for controlling the control information read out by the multifunction peripheral managing section 24 to be transmitted to the multifunction peripheral 1.

Accordingly, in the multifunction peripheral control system 100 of the present embodiment, the information processor 2 uniformly manages the control information that was conventionally registered for each multifunction peripheral. This makes it possible to change control information registered in a plurality of multifunction peripherals merely by changing the details of the control information managing table in the information processor 2 even in a case where the control information registered in the plurality of multifunction peripherals should be changed.

Further, in the multifunction peripheral control system 100 of the present embodiment, the multifunction peripheral 1 transmits, to the information processor 2, the reception notification including the reception information of the image data received by the multifunction peripheral 1 while retaining the image data. This makes it possible to reduce network traffic between the multifunction peripheral 1 and the information processor 2.

Accordingly, the present embodiment makes it possible to produce a multifunction peripheral control system 100 in which a predetermined process can be executed on the image data received by the multifunction peripheral 1 while the multifunction peripheral 1 has not registered the control information therein.

Further, the present embodiment describes a configuration in which the sections control section 10 of the multifunction peripheral 1 creates, on the basis of the control information, the control commands for controlling the sections of the multifunction peripheral 1. However, the present invention is not limited to this configuration, and the present invention includes, for example, a configuration in which the multifunction peripheral control section 25 of the information processor 2 creates the control commands on the basis of the control information so as to directly control the sections of the multifunction peripheral 1.

MODIFIED EXAMPLE 1

The above-described embodiment describes the control notification that includes the process to be executed and the destination information as the control information, with reference to FIG. 6. However, the present invention is not limited to this embodiment. The control notification may further include, for example, control information on a case where an error occurs.

As described above, in a case where control information received by the multifunction peripheral 1 is information on an instruction of transmitting image data to a predetermined destination, the multifunction peripheral 1 executes a transmission process on the image data according to the control information. However, the image data is not possibly transmitted to the predetermined destination due to occurrence of a network trouble or the like.

In a case where a transmission error occurs, the multifunction peripheral 1 can be controlled to execute a retransmission process. However, in a case where the predetermined destination has a trouble, the multifunction peripheral 1 cannot transmit the image data until the trouble of the predetermined destination is eliminated. This leads to accumulation of unfinished transmission jobs in the multifunction peripheral 1.

In order to prevent the accumulation, it is preferable that the multifunction peripheral 1 has received a control notification including, as control information, a second process to be executed on a case where a transmission error occurs. Examples of the second process to be executed encompass causing the multifunction peripheral 1 to execute a print process, letting an administrator know the transmission error occurrence by e-mail or the like in the case where the transmission error occurs.

FIG. 7 is a view showing a part of a control notification including control information on the case where an error occurs. As shown in FIG. 7, the control notification including the control information on the case where an error occurs includes control information on the case where an error occurs <error><process><type>print</type></process></error> other than normal control information. The control notification shown in FIG. 7 includes <type>print</type> as a second process to be executed. In the case where a transmission error occurs, printing is carried out as the second process to be executed. Specifically, the multifunction peripheral 1 executes a transmission process on image data according to the normal control information when receives the control notification. Thereafter, in the case where a transmission error occurs, the multifunction peripheral 1 executes a print process on the image data according to the control information on the case where an error occurs.

The control notification including the control information on the case where an error occurs makes it possible to, for example, prevent unfinished jobs from accumulating in the multifunction peripheral 1.

MODIFIED EXAMPLE 2

The above-described embodiment describes, with reference to FIG. 4, a flow of the image data coordination process in which the multifunction peripheral 1 transmits a reception notification to the information processor 2, and the information processor 2 transmits control information to the multifunction peripheral 1 in response to the reception notification. However, the present invention is not limited to this embodiment. The present invention includes, for example, an image data coordination process in which the multifunction peripheral 1 further transmits a process start notification and a process end notification to the information processor 2.

It is preferable that the information processor 2 grasp whether or not the multifunction peripheral 1 has properly executed a predetermined process on image data on the basis of a control notification transmitted to the multifunction peripheral 1. This is because, for example, it is possible to provide a user with information on, for example, the whereabouts of output data by arranging such that the information processor 2 grasps whether or not the multifunction peripheral 1 has properly executed a transmission process or a print process in the case of error occurrence in response to an instruction of transmitting image data.

Figures 8, 9, 10:
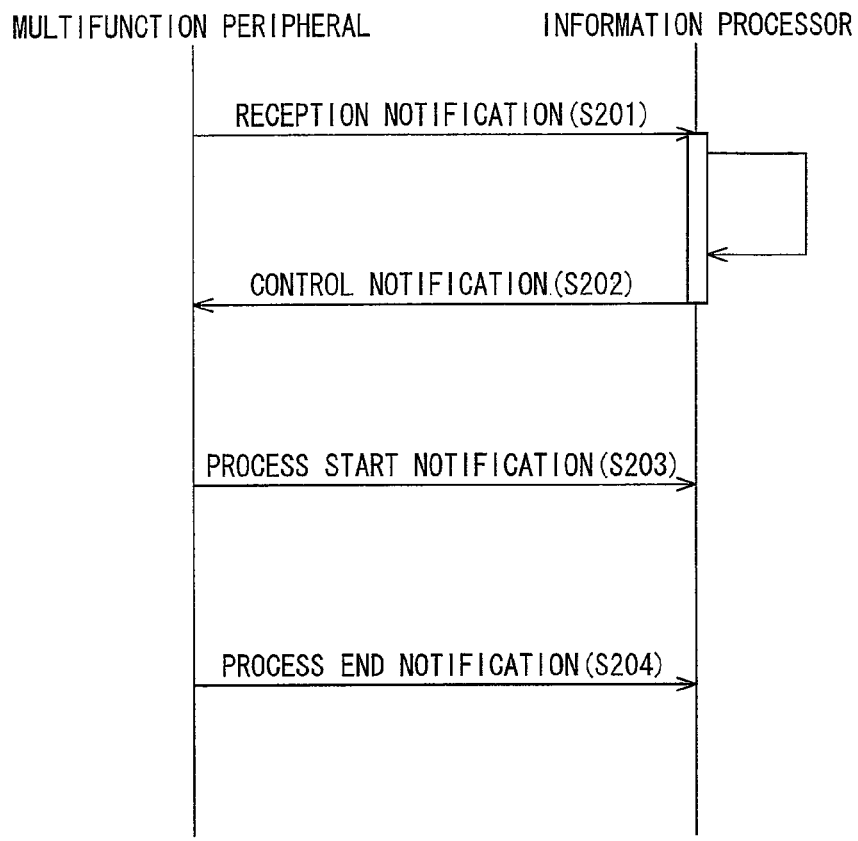
FIG. 8 is a sequence showing a modified example of an image data coordination process in accordance with the present embodiment.
FIG. 9 is a view showing a part of a process start notification transmitted at S203 of FIG. 8.
FIG. 10 is a view showing a part of a process end notification transmitted at S204 of FIG. 8.

FIG. 8 is a sequence showing a modified example of an image data coordination process that the multifunction peripheral 1 and the information processor 2 of the multifunction peripheral control system 100 carry out in association with each other. As shown in FIG. 8, the multifunction peripheral 1 receives a control notification (S202), and then transmits, to the information processor 2, a process start notification for notifying a start of a process (S203), and a process end notification for notifying an end of the process (S204). In this case, the reception notification, the process start notification, and the process end notification each include identification information such as JobId that allows a job to be uniquely identified, so that image data to which a notification of the job is directed can be specified.

FIG. 9 is a view showing a part of a process start notification transmitted at S203 of FIG. 8. FIG. 10 is a view showing a part of a process end notification transmitted at S204 of FIG. 8. As shown in FIGS. 9 and 10, the process start notification and the process end notification include identification information <fileId>1234</fileId> as with the reception notification shown in FIG. 5. The identification information <fileId>1234</fileId> makes it possible to identify image data to which a notification of the process is directed.

As described above, the multifunction peripheral 1 transmits the process start notification and the process end notification to the information processor 2. This allows the information processor 2 to grasp whether or not the multifunction peripheral 1 has properly executed a process. It is accordingly possible to provide the information on, for example, the whereabouts of output data to a user.

MODIFIED EXAMPLE 3

The above-described embodiment describes, with reference to FIG. 3, the control information managing table in which the process to be executed and the destination information are registered as control information. Determining a place where image data is stored for each registration reception information in the control information managing table makes it possible to prevent a third party from seeing the image data, thereby preventing information leak.

Normally, facsimile data whose destination cannot be specified is printed or can be displayed as a preview even in a case where the facsimile data is stored in the multifunction peripheral 1 without being printed when received by the multifunction peripheral 1. Therefore, unspecified large number of users can see the facsimile data. This possibly causes information leak. Meanwhile, determining a place where image data is stored for each registration reception information in the control information managing table makes it possible to prevent a third party from seeing the image data, thereby preventing information leak.

FIG. 11 is a table showing a modified example of the control information managing table. According to a control information managing table shown in FIG. 11, image data is to be stored in user holders. In a case where the sections control section 10 receives control information including such destination information, the sections control section 10 executes a process of storing the image data in a predetermined user holder according to the control information. Note that a place where the user holders are stored is not particularly limited. In this example, the user holders are stored in the image data storage section 16.

Figure 12:
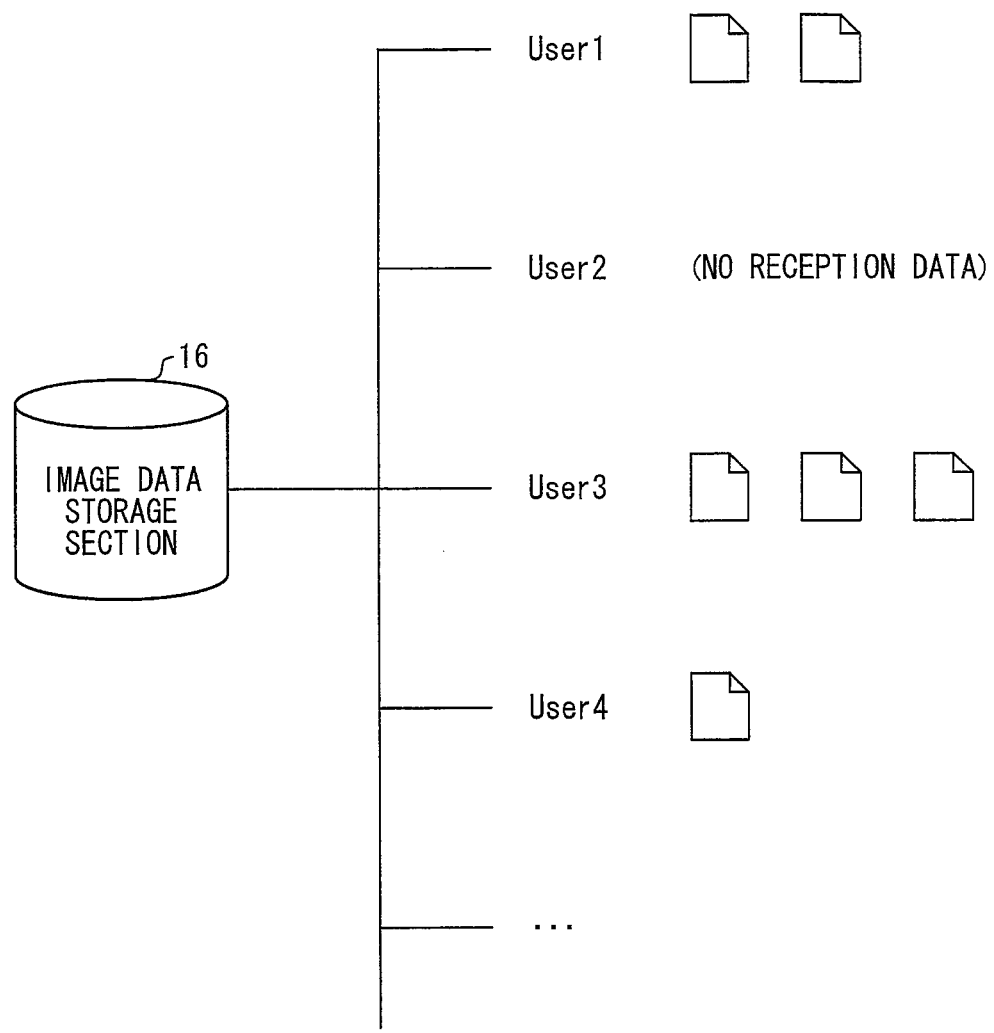
FIG. 12 is a view schematically showing an example of a configuration of an image data storage section shown in FIG. 2.

FIG. 12 is a view schematically showing an example of a configuration of the image data storage section 16. As shown in FIG. 12, the image data storage section 16 stores a plurality of user holders therein. Each of the user holders stores image data for each sender's information. For example, a "User 1" holder stores two files of image data therein, and a "User 2" holder stores no file of image data therein.

In a case where a user starts operating the multifunction peripheral 1, and a login user is specified by an authentication process, the sections control section 10 reads out image data stored in a corresponding user holder, and causes the display section 11b to display the image data thus read out thereon. Alternatively, the sections control section 10 controls the sections to display, on the display section 11b, whether or not the corresponding user holder stores image data.

As described above, the place where the image data is stored is determined for each sender's information in the control information managing table. This makes it possible to prevent a third party from seeing the image data, thereby preventing information leak.

Summary of Embodiment

A multifunction peripheral of the present embodiment is a multifunction peripheral communicable with an information processor via a communication network, including: image data receiving means for receiving image data via the communication network; image data storage means for storing the image data received by the image data receiving means; reception information transmitting means for transmitting, to the information processor, reception information including sender's information of the image data received by the image data receiving means; control information receiving means for receiving, from the information processor, control information including a first process to be executed on the image data received according to details of the reception information; and sections control means for executing, according to the control information, the first process to be executed on the image data stored in the image data storage means.

According to the configuration, in a case where the image data receiving means receives the image data via the communication network, the image data storage means stores the image data therein, and the reception information transmitting means transmits the reception information including the sender's information of the image data to the information processor.

What is meant by the reception information is various information such as sender's information on image data. Examples of the sender's information encompass a facsimile number, an e-mail address, an Internet facsimile address of a sender that sends the image data.

Further, in a case where the control information receiving means receives, from the information processor, the control information including the first process to be executed on the image data, the sections control section executes the first process on the image data according to the control information.

As described above, according to the configuration, the multifunction peripheral obtains the control information for the image data from the information processor by transmitting the reception information to the information processor while retaining the image data received by the multifunction peripheral.

This configuration makes it possible to produce a multifunction peripheral capable of executing a predetermined process on the image data thus received without having registered the control information therein.

It is preferable to configure the multifunction peripheral of the present embodiment such that the first process to be executed be transmitting, printing, deleting or storing.

According to the configuration, the control information received by the control information receiving means includes transmitting, printing, deleting or storing as the first process to be executed. This allows the sections control section to execute a plurality of processes such as transmitting, printing, deleting or storing on the image data according to the control information.

As described above, various processes can be executed on the image data. This leads to flexibly applying the image data.

It is preferable to configure the multifunction peripheral of the present embodiment such that the control information include a second process to be executed, and the sections control means execute the second process to be executed in a case where the sections control means fails to execute the first process to be executed.

According to the configuration, the control information received by the control information receiving means includes the second process to be executed in addition to the first process to be executed. Further, the sections control means executes the second process on the image data when the sections control means fails to execute the first process on the image data.

For example, in a case where the first process to be executed is transmitting the image data, the sections control section executes a transmission process on the image data according to the control information. However, in a case where the image data cannot be transmitted due to occurrence of a network trouble or the like, unfinished transmission jobs are accumulated in the multifunction peripheral. In order to prevent the accumulation, it is preferable that the control information include the second process to be executed so that a printing process is executed on the image data in a case where a transmission error occurs.

As described above, the control information includes the second process to be executed in the case where the sections control section fails to execute the first process to be executed. This makes it possible to eliminate, for example, the problem of accumulating the unfinished jobs in the multifunction peripheral.

It is preferable that the multifunction peripheral of the present embodiment further include notification means for notifying the information processor of a start or an end of a process to be executed on the image data stored in the image data storage means.

According to the configuration, the notification means notifies the information processor of the start or the end of the process to be executed on the image data. This enables the information processor to grasp whether or not the process has been properly executed on the image data.

With this, the information on, for example, the whereabouts of output data can be provided to a user.

It is preferable to configure the multifunction peripheral of the present embodiment such that the reception information include (i) types of reception specifying a reception method of the image data received by the image data receiving means, (ii) a size of the image data, (iii) a communication start time of the image data, (iv) a communication end time of the image data or (v) information on facsimile line.

According to the configuration, the reception information transmitted from the reception information transmitting means to the information processor includes (i) the type of reception specifying the reception method of the image data, (ii) the size of the image data, (iii) the communication start time of the image data, (iv) the communication end time of the image data or (v) information on facsimile line.

The type of reception of the present embodiment specifies a reception method of image data received by the image data receiving means. Examples of the type of reception encompass a facsimile, an Internet facsimile and an e-mail. Registering the types of reception as the reception information makes it possible to transmit an Internet facsimile by e-mail in a case of receiving the Internet facsimile, and to print a facsimile in a case of receiving the facsimile by a telephone line.

Further, registering the image data size as the reception information makes it possible to change control information in accordance with the image data size. For example, image data having a size smaller than a predetermined size can be transmitted to a mobile terminal device, and image data having at least the predetermined size can be transmitted to a PC.

Further, registering the communication start time and the communication end time as the reception information makes it possible, for example, not to transmit image data which it takes longer than a predetermined communication time to transmit because it is predictable that it takes time to transmit the image data.

Further, the types of lines of the present embodiment specify a facsimile line that receives image data among a plurality of facsimile lines in a case where the multifunction peripheral includes the plurality of facsimile lines. Registering, as the reception information, the information on facsimile line makes it possible, for example, to transmit, to a sales department, image data transmitted through a facsimile line A because the facsimile line A is used for ordering, and to print image data transmitted through a facsimile line B because the facsimile line B is used for communication between a head office and a branch office of a company.

As described above, registering the types of reception, the image data size, the communication start time and the communication end time or the types of lines as the reception information makes it possible to flexibly apply the image data.

It is preferable to configure the multifunction peripheral of the present embodiment such that the control information include destination information on (i) a destination to which the image data stored in the image data storage means is transmitted or (ii) a place where the image data stored in the image data storage means is stored.

According to the configuration, the control information includes the destination information on (i) the destination to which the image data is transmitted or (ii) the place where the image data is stored.

This enables the sections control section to transmit the image data to a predetermined destination or to store the image data in a predetermined holder, on the basis of the control information.

Normally, facsimile data whose destination cannot be specified is printed or can be displayed as a preview even in a case where the facsimile data is stored in the multifunction peripheral without being printed when received by the multifunction peripheral. Therefore, unspecified large number of users can see the facsimile data. This possibly causes information leak. Meanwhile, according to the present embodiment, the sections control section can execute a process such as storing image data transmitted from an identical sender in a specific user holder by determining a place where the image data is to be stored with reference to the destination information.

This makes it possible to prevent unspecified large number of users from seeing the image data, thereby preventing information leak.

An information processor of the present embodiment is an information processor communicable with the multifunction peripheral via the communication network, including: control information storage means for storing specifying information in association with control information including a first process to be executed on image data received according to details of the specifying information, the specifying information including at least a part of the reception information and at least the sender's information; reception information receiving means for receiving the reception information from the reception information transmitting means; control information reading means for reading out, from the control information storage means, the control information corresponding to the specifying information among the reception information received by the reception information receiving means; and control information transmission controlling means for controlling the control information read out by the control information reading means to be transmitted to the control information receiving means.

According to the configuration, in a case where the reception information receiving means receives the reception information, the control information reading means reads out the control information corresponding to the reception information from the control information storage means. Further, the control information transmission controlling means controls the control information read out by the control information reading means to be transmitted to the control information receiving means. That is, the information processor uniformly manages the control information to be transmitted to the multifunction peripheral.

This makes it possible to produce an information processor capable of causing the multifunction peripheral to execute a predetermined process on the image data thus received while the multifunction peripheral has not registered the control information therein.

A multifunction peripheral control system of the present embodiment, including a multifunction peripheral and an information processor communicable with each other via a communication network, the multifunction peripheral, including: image data receiving means for receiving image data via the communication network; image data storage means for storing the image data received by the image data receiving means; reception information transmitting means for transmitting, to the information processor, reception information including sender's information of the image data received by the image data receiving means; control information receiving means for receiving, from the information processor, control information including a first process to be executed on the image data received according to details of the reception information; and sections control means for executing, according to the control information, the first process to be executed on the image data stored in the image data storage means, the information processor, including: control information storage means for storing specifying information in association with control information including a first process to be executed on image data received according to details of the specifying information, the specifying information including at least a part of the reception information and at least the sender's information; reception information receiving means for receiving the reception information from the reception information transmitting means; control information reading means for reading out, from the control information storage means, the control information corresponding to the specifying information among the reception information received by the reception information receiving means; and control information transmission controlling means for controlling the control information read out by the control information reading means to be transmitted to the control information receiving means.

According to the configuration, the multifunction peripheral control system includes the multifunction peripheral and the information processor. It is accordingly possible to produce a multifunction peripheral control system capable of causing the multifunction peripheral to execute a predetermined process on the image data thus received without causing the multifunction peripheral to register the control information therein.

The multifunction peripheral and the information processor can be configured by a computer. In this case, the present invention encompasses (i) a program for causing a computer to serve as the multifunction peripheral and the information processor by causing the computer to operate as the means of the multifunction peripheral and the information processor, and (ii) a computer-readable storage medium in which the program is stored.

The present invention is not limited to the description of the embodiments above, but may be altered by a skilled person within the scope of the claims. An embodiment based on a proper combination of technical means disclosed in different embodiments is encompassed in the technical scope of the present invention.

Further, blocks of the multifunction peripheral 1 and the information processor 2 can be configured by hardware logic, alternatively by software by employing a CPU as follows.

That is, the multifunction peripheral 1 and the information processor 2 include a CPU (central processing unit) for executing instructions in control programs realizing the functions, a ROM (read only memory) that contains the control programs, a RAM (random access memory) that develops the control programs, and a storage device (storage medium) such as a memory containing the control programs and various data.

An object of the present invention can also be achieved, by mounting, to the multifunction peripheral 1 and the information processor 2, a computer-readable storage medium storing control program codes (executable program, intermediate code program, or source program) for the sections control section 10 and the image data coordination processing section 21, serving as software for realizing the foregoing respective functions, so that the computer (or CPU or MPU) retrieves and executes the program code stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD or CD-R; a card such as an IC card (memory card) or an optical card; or a semiconductor memory such as a mask ROM, EPROM, EEPROM or flash ROM.

Alternatively, the multifunction peripheral 1 and the information processor 2 can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual dedicated network (virtual private network), telephone line network, mobile communications network, or satellite communications network. The transfer medium which constitutes the communications network is not limited to a specific one, and therefore can be, for example, wired line such as IEEE 1394, USB, electric power line, cable TV line, telephone line or ADSL line; or wireless such as infrared radiation (IrDA, remote control), Bluetooth (Registered Trademark), 802.11 wireless, HDR, mobile telephone network, satellite line or terrestrial digital network. The present invention encompasses a carrier wave, in which computer data signal which is embodied by electronic transmission of the program codes, is embedded.

INDUSTRIAL APPLICABILITY

The present invention is suitably applicable to a multifunction peripheral control system in which an information processor uniformly manages control information for image data received by a multifunction peripheral such as a facsimile having a communication function.

REFERENCE SIGNS LIST

1: multifunction peripheral
2: information processor
10: sections control section (sections control means)
14: first communication section (image data receiving means, reception information transmitting means, control information receiving means, and notification means)
15: modem (image data receiving means)
16: image data storage section (image data storage means)
20: second communication section (reception information receiving means)
21: image data coordination processing section
24: multifunction peripheral control section (control information reading means)
25: multifunction peripheral control section (control information transmission controlling means)
26: control information database (control information storage means)
50: communication network line (communication network)
51: telephone line (communication network)
100: multifunction peripheral control system

The invention claimed is:

1. A multifunction peripheral communicable with an information processor via a communication network, comprising:
   image data receiving means for receiving image data via the communication network;
   image data storage means for storing the image data received by the image data receiving means;
   reception information transmitting means for transmitting, to the information processor, reception information including sender's information of the image data received by the image data receiving means;
   control information receiving means for receiving, from the information processor, control information including a first process to be executed on the image data received according to details of the reception information; and
   sections control means for causing, according to the control information, the first process to be executed on the image data stored in the image data storage means,
   the reception information including a type of reception specifying a facsimile, an Internet facsimile, or an e-mail, each of which is a reception method of the image data received by the image data receiving means,
   the control information being managed in a control information managing table of the information processor, the control information managing table including the sender's information, the type of reception, and the control information in such a manner that (i) the sender's information and the type of reception and (ii) the control information are associated with each other, and
   the first process is transmitting, printing, deleting or storing.

2. The multifunction peripheral as set forth in claim 1, wherein the control information includes a second process to be executed, and
   the sections control means causes the second process to be executed, in a case where the sections control means fails to cause the first process to be executed.

3. The multifunction peripheral as set forth in claim 1, further comprising notification means for notifying the information processor of a start or an end of a process to be executed on the image data stored in the image data storage means.

4. The multifunction peripheral as set forth in claim 1, wherein the control information includes destination information on (i) a destination to which the image data stored in the image data storage means is transmitted or (ii) a place where the image data stored in the image data storage means is stored.

5. An information processor communicable with a multifunction peripheral as set forth in claim 1 via the communication network, comprising:
   control information storage means for storing specifying information in association with control information including a first process to be executed on image data received according to details of the specifying information, the specifying information being at least a part of the reception information, which part includes at least the sender's information;
   reception information receiving means for receiving the reception information from the reception information transmitting means;
   control information reading means for reading out, from the control information storage means, the control information corresponding to the specifying information in the reception information received by the reception information receiving means; and
   control information transmission controlling means for controlling transmission of the control information to the control information receiving means, the control information being read out by the control information reading means.

6. A non-transitory computer-readable storage medium in which a program for causing a computer to function as means included in an information processor as set forth in claim 5 is stored.

7. A non-transitory computer-readable storage medium in which a program for causing a computer to function as means included in a multifunction peripheral as set forth in claim 1 is stored.

8. A multifunction peripheral control system, comprising a multifunction peripheral and an information processor communicable with each other via a communication network,
   the multifunction peripheral, comprising:
      image data receiving means for receiving image data via the communication network;
      image data storage means for storing the image data received by the image data receiving means;
      reception information transmitting means for transmitting, to the information processor, reception information including (i) sender's information of the image data received by the image data receiving means and (ii) a type of reception specifying a facsimile, an Internet facsimile, or an e-mail, each of which is a reception method of the image data;
      control information receiving means for receiving, from the information processor, control information including a first process to be executed on the image data received according to details of the reception information; and
      sections control means for causing, according to the control information, the first process to be executed on the image data stored in the image data storage means,
   the information processor, comprising:
      control information storage means for storing a control information managing table in which specifying information and control information are associated with each other and managed, the control information including, as a first process, transmitting, printing, deleting or storing, each of which is a process to be executed on image data received according to details of the specifying information, the specifying information being at least a part of the reception information, which part includes at least the sender's information and the type of reception;

reception information receiving means for receiving the reception information from the reception information transmitting means;

control information reading means for reading out, from the control information managing table in the control information storage means, the control information corresponding to the specifying information in the reception information received by the reception information receiving means; and control information transmission controlling means for controlling transmission of the control information to the control information receiving means, the control information being read out by the control information reading means.

* * * * *